(12) United States Patent
Ogawa (10) Patent No.: US 9,300,825 B2
(45) Date of Patent: Mar. 29, 2016

(54) OPERATION DEVICE, IMAGE FORMING APPARATUS, AND OPERATION METHOD (71) Applicant: KYOCERA Document Solutions Inc., Osaka-shi, Osaka (JP)

(72) Inventor: Tomohiro Ogawa, Osaka (JP)

(73) Assignee: KYOCERA Document Solutions Inc., Osaka-shi (JP)

(*) Notice: Subject to any disclaimer, the term of this patent is extended or adjusted under 35 U.S.C. 154(b) by 0 days.

(21) Appl. No.: 14/064,012

(22) Filed: Oct. 25, 2013

(65) Prior Publication Data
US 2014/0118786 A1    May 1, 2014

(30) Foreign Application Priority Data
Oct. 31, 2012 (JP) ................................ 2012-240086

(51) Int. Cl.
*G06F 3/12* (2006.01)
*H04N 1/00* (2006.01)
*G03G 15/00* (2006.01)

(52) U.S. Cl.
CPC ......... *H04N 1/00381* (2013.01); *G03G 15/502* (2013.01); *H04N 1/00411* (2013.01); *H04N 1/00424* (2013.01); *H04N 1/00474* (2013.01); *H04N 2201/0094* (2013.01)

(58) Field of Classification Search
None
See application file for complete search history.

(56) References Cited

U.S. PATENT DOCUMENTS

| 2008/0244402 A1 | 10/2008 | Sakakibara et al. |
| 2009/0319889 A1* | 12/2009 | Nakada et al. ................. 715/273 |
| 2010/0058237 A1* | 3/2010 | Nishizaki et al. ............. 715/812 |
| 2012/0044169 A1 | 2/2012 | Enami |

FOREIGN PATENT DOCUMENTS

| CN | 101610333 A | 12/2009 |
| JP | 08340452 A | 12/1996 |
| JP | 2002149587 A | 5/2002 |
| JP | 2006065706 A | 3/2006 |
| JP | 2011076554 A | 4/2011 |
| JP | 2011150384 A | 8/2011 |
| JP | 2012065788 A | 4/2012 |
| JP | 2013030965 A | 2/2013 |

OTHER PUBLICATIONS

European Patent Office, Extended European Search Report of 13190327.0, Feb. 18, 2014, Germany, 7 pages.

* cited by examiner

*Primary Examiner* — Huo Long Chen
(74) *Attorney, Agent, or Firm* — Alleman Hall McCoy Russell & Tuttle LLP (57) ABSTRACT

An operation device according to one aspect of the present disclosure includes a touch panel, storage portion, and display reception portion. The touch panel displays a predetermined screen, and, when a key representing a predetermined name has been pressed on the screen, receives an input of a setting condition regarding the key. The storage portion stores as a table a name of a key displayed on the screen and an alternative name in association with each other, the alternative name being different from the name and representing a function substantially equivalent to a function of the name. The display reception portion, if an alternative name exists for a name in the table, displays, near a key of the name for which the alternative name exists, the alternative name corresponding to the name.

5 Claims, 7 Drawing Sheets

| FUNCTION NAME | ALTERNATIVE FUNCTION NAME | DISPLAY CAPABILITY |
|---|---|---|
| DOCUMENT SIZE | — | — |
| PAPER SHEET SIZE | — | — |
| ... | ... | ... |
| AGGREGATE | TOGETHER ON ONE SHEET | ON |
| ... | ... | ... |
| OCR | CHARACTER RECOGNITION PDF | ON |
| | SEARCH-ALLOWED PDF | |
| | SEARCHABLE PDF | |
| BACKGROUND COLOR ADJUSTMENT | BACKGROUND DELETION | ON |
| SMB | SHARED FOLDER | ON |
| | SHARED FOLDER TRANSMISSION SCANNING | |
| ... | ... | ... |

OPERATION DEVICE, IMAGE FORMING APPARATUS, AND OPERATION METHOD

INCORPORATION BY REFERENCE

This application is based upon and claims the benefit of priority from the corresponding Japanese Patent Application No. 2012-240086 filed on Oct. 31, 2012, the entire contents of which are incorporated herein by reference.

BACKGROUND

The present disclosure relates to an operation device, an image forming apparatus, and an operation method. In particular, the present disclosure relates to a technique for enabling a user to input a desired setting condition without being confused about a key operation even if the interchangeabilities of the names of keys are different between companies.

Conventionally, as a facsimile apparatus that enhances the confidentiality of communication content, an apparatus employing facsimile communication using a confidential communication method is known. In the case of the facsimile apparatus employing facsimile communication using a confidential communication method, a transmitting-end facsimile apparatus stores a first confidential code (an identification code) input through an input portion, and compares the first confidential code with a second confidential code received from a receiving-end facsimile apparatus. If the first confidential code matches the second confidential code, the transmitting-end facsimile apparatus transmits image data of a transmission document sheet to the receiving-end facsimile apparatus.

In addition, the transmitting-end facsimile apparatus adds the first confidential code input through the input portion to the image data of the transmission document sheet when transmitting the image data. The receiving-end facsimile apparatus stores the received image data together with the first confidential code in a memory. When the second confidential code has been input through an input portion, the receiving-end facsimile apparatus obtains from the memory the image data to which the first confidential code that matches the second confidential code has been added, and the receiving-end facsimile apparatus performs the print output of the image data.

In the conventional facsimile apparatus employing facsimile communication using a confidential communication method, however, the manufacturing company of the facsimile apparatus controls the transmission and the reception of the confidential codes by a method uniquely determined by the manufacturing company. Thus, if the facsimile apparatus communicates with a facsimile apparatus manufactured by another company, the model of the transmitting-end facsimile apparatus and the model of the receiving-end facsimile apparatus are different from each other, and therefore do not have communication compatibility. Thus, it is not possible to achieve confidential communication.

In response to such a problem, a facsimile apparatus is known that can perform facsimile communication using a confidential communication method in accordance with a transmission control procedure standardized by the ITU-T (former CCITT recommendations), and can achieve highly confidential facsimile communication while maintaining the compatibility with the model of another company. The facsimile apparatus includes: confidential code detection means that detects a confidential code added to a predetermined signal among signals received by a data link establishment procedure of facsimile communication, the procedure standardized by the ITU-T; storage means that, when the confidential code has been detected, stores image data to be received subsequent to the signal to which the confidential code has been added, so as to correspond to the confidential code; input means that inputs a confidential code; and image data output means that, when the input means has input a confidential code, reads and outputs image data stored in the storage means so as to correspond to the input confidential code.

In addition, a storage medium is known that has stored therein a utility program for performing the process of changing the settings of a peripheral device connected to a PC and the process of confirming the settings of the peripheral device. The storage medium performs: a storage process for holding in advance a list describing product names of the peripheral device; an acquisition process for acquiring a product name of a peripheral device connected to the PC when the PC has been started; and a comparison process for comparing the product name acquired by the acquisition process, with the product names described in the list held in the storage process. If, as a result of the comparison in the comparison process, the product names match each other, a transition is made to main processing.

Image forming apparatuses such as multifunction peripherals, copying machines, and printers are developed by multiple companies. The specifications and the forms of the image forming apparatuses, however, are different between the companies. Thus, if a conventionally used image forming apparatus of a company is replaced by an image forming apparatus of another company, a user may feel confused until the user becomes accustomed to using the image forming apparatus of the other company.

Here, examples of the differences between the image forming apparatuses of the companies include function names. The function names depend greatly on the specifications of the image forming apparatuses of the companies, and therefore particularly have a variety among the companies. Meanwhile, although the function names of the image forming apparatuses are different among the companies, the contents of the functions are, under current circumstances, substantially equivalent to one another.

In light of such current circumstances, when, after the above replacement has been performed, the user uses the image forming apparatus after the replacement, the user tends to set a condition using the function name of the current image forming apparatus based on the function name of the previously used image forming apparatus. In this case, the function name of the previous image forming apparatus and the function name of the current image forming apparatus are different from each other, and therefore, the user cannot smoothly set the condition.

In addition, if the function name of the current image forming apparatus is so different from the function name of the previous image forming apparatus that the user cannot guess the function name of the current image forming apparatus from the function name of the previous image forming apparatus, the user may not be able to input the setting condition of a desired function without noticing a function name desired by the user even though the desired function name is displayed on an operation panel.

SUMMARY

An operation device according to one aspect of the present disclosure includes a touch panel, storage portion, and display reception portion. The touch panel displays a predetermined screen, and, when a key representing a predetermined name has been pressed on the screen, receives an input of a setting condition regarding the key. The storage portion stores as a table a name of a key displayed on the screen and an alternative name in association with each other, the alternative name being different from the name and representing a function substantially equivalent to a function of the name. The display reception portion, if an alternative name exists for a name in the table, displays, near a key of the name for which the alternative name exists, the alternative name corresponding to the name.

An image forming apparatus according to another aspect of the present disclosure includes a touch panel, storage portion, and display reception portion. The touch panel displays a predetermined screen, and, when a key representing a predetermined name has been pressed on the screen, receives an input of a setting condition regarding the key. The storage portion stores as a table a name of a key displayed on the screen and an alternative name in association with each other, the alternative name being different from the name and representing a function substantially equivalent to a function of the name. The display reception portion, if an alternative name exists for a name in the table, displays, near a key of the name for which the alternative name exists, the alternative name corresponding to the name.

An operation method according to another aspect of the present disclosure is an operation method of an operation device that, when a key representing a predetermined name has been pressed on a predetermined screen on a touch panel, receives an input of a setting condition regarding the key. The operation method includes: a step of storing as a table a name of a key displayed on the screen and an alternative name in association with each other, the alternative name being different from the name and representing a function substantially equivalent to a function of the name; and a step of, if an alternative name exists for a name in the table, displaying, near a key of the name for which the alternative name exists, the alternative name corresponding to the name.

A storage medium according to another aspect of the present disclosure is a computer-readable storage medium having stored therein a program for causing a computer to execute an operation method of an operation device that, when a key representing a predetermined name has been pressed on a predetermined screen on a touch panel, receives an input of a setting condition regarding the key. The operation method includes: a step of storing as a table a name of a key displayed on the screen and an alternative name in association with each other, the alternative name being different from the name and representing a function substantially equivalent to a function of the name; and a step of, if an alternative name exists for a name in the table, displaying, near a key of the name for which the alternative name exists, the alternative name corresponding to the name.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, with reference to the accompanying drawings, an embodiment of an image forming apparatus including an operation device according to the present disclosure will be described for the understanding of the present disclosure. It should be noted that the following embodiment is a specific example of the present disclosure, but does not limit the technical scope of the present disclosure. Further, the alphabetical letter "S" before the numbers in a flowchart means "step".

<Operation Device and Image Forming Apparatus>

Hereinafter, the image forming apparatus according to the embodiment of the present disclosure will be described.

Figure 1:
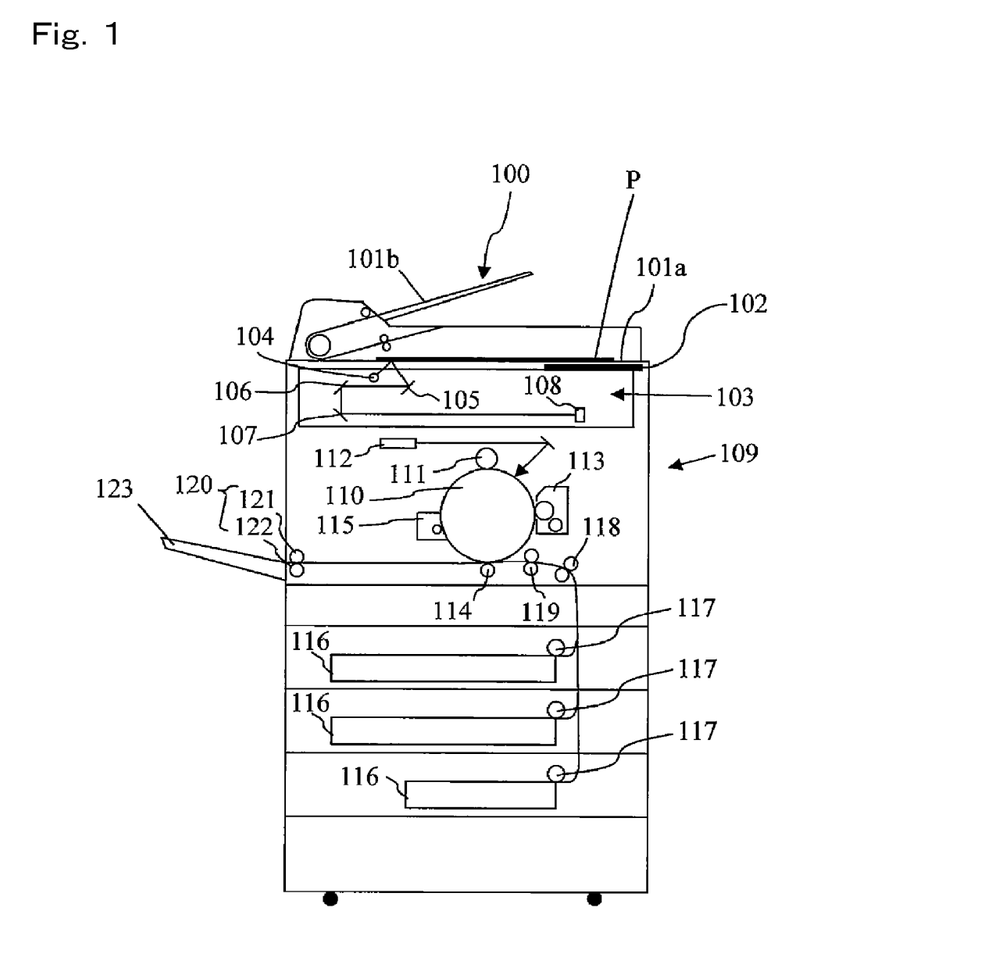
FIG. 1 is a conceptual diagram showing the overall configuration of the inside of a multifunction peripheral according to the present disclosure.

FIG. 1 is a conceptual diagram showing the overall configuration of the inside of a multifunction peripheral according to the present disclosure. However, the details of components not directly related to the present disclosure are omitted. It should be noted that the image forming apparatus according to the present disclosure corresponds to, for example, a printer, a scanner, or a multifunction peripheral including a printer, a copier, a scanner, a fax, and the like. The image forming apparatus according to the present disclosure functions as an image forming apparatus having a copy function, a scanner function, a facsimile function, a printer function, and the like. For example, hereinafter, a brief description will be given of the operation of a multifunction peripheral 100 (MFP: Multi Function Peripheral) when a copy function is used.

First, when a user uses the multifunction peripheral 100, the user places a document sheet P on a document sheet platen 101a provided on the upper surface of the multifunction peripheral 100, or on an automatic document sheet feeding portion 101b, and inputs the setting of the copy function through an operation portion 102. The operation portion 102 displays a print screen (an initial screen or the like) related to the copy function provided by the multifunction peripheral 100, and displays a plurality of setting item keys related to the copy function, so that the setting item keys can be selected. The user inputs a setting condition regarding the copy function through the print screen.

When having completed the input of the setting condition, the user presses a start key provided in the operation portion 102 to cause the multifunction peripheral 100 to start the processing of the copy function.

When the multifunction peripheral 100 has started the processing of the copy function, in an image reading portion 103, the light emitted from a light source 104 is reflected by the document sheet placed on the document sheet platen 101a. The reflected light is guided to an image sensor 108 by mirrors 105, 106, and 107. The guided light is photoelectrically converted by the image sensor 108 and is subjected to a basic correction process, a basic image quality process, a basic compression process, and the like, thereby generating image data corresponding to the document sheet.

An image forming portion 109 is a driving portion that transfers the image data as a toner image. The image forming portion 109 includes a photosensitive drum 110. The photosensitive drum 110 rotates in a predetermined direction at a constant speed. Around the photosensitive drum 110, a charging device 111, an exposure unit 112, a developing device 113, a transfer device 114, a cleaning unit 115, and the like are arranged in this order, starting from the upstream side of the rotational direction.

The charging device 111 uniformly charges the surface of the photosensitive drum 110. The exposure unit 112 irradiates the surface of the charged photosensitive drum 110 with laser on the basis of the image data to form an electrostatic latent image. The developing device 113 applies toner onto the conveyed electrostatic latent image to form a toner image. The formed toner image is transferred onto a recording medium (for example, a sheet) by the transfer device 114. The cleaning unit 115 removes excess toner remaining on the surface of the photosensitive drum 110. This series of processes is performed by the rotation of the photosensitive drum 110.

The sheet is conveyed from a plurality of sheet feeding cassettes 116 included in the multifunction peripheral 100. When conveyed, the sheet is pulled out of one of the sheet feeding cassettes 116 into a conveyance path by a pick-up roller 117. The sheet feeding cassettes 116 accommodate sheets of paper types different from one another and each feed a sheet on the basis of the setting regarding the setting condition.

The sheet pulled out into the conveyance path is fed to between the photosensitive drum 110 and the transfer device 114 by conveying rollers 118 and registration rollers 119. The toner image is transferred onto the fed sheet by the transfer device 114, and the resulting sheet is conveyed to a fixing device 120.

When the sheet onto which the toner image has been transferred is passed through between a heating roller 121 and a pressure roller 122 included in the fixing device 120, heat and pressure are applied to the toner image, thereby fixing a visible image on the sheet. The amount of heat of the heating roller 121 is optimally set in accordance with the paper type, thereby appropriately performing the fixing. After the visible image has been fixed on the sheet and the image formation has ended, the sheet on which the visible image has been fixed is discharged to a sheet discharge tray 123 through the fixing device 120, and is placed and accommodated in the sheet discharge tray 123.

By the above procedure, the multifunction peripheral 100 provides the user with the copy function.

Figure 2:
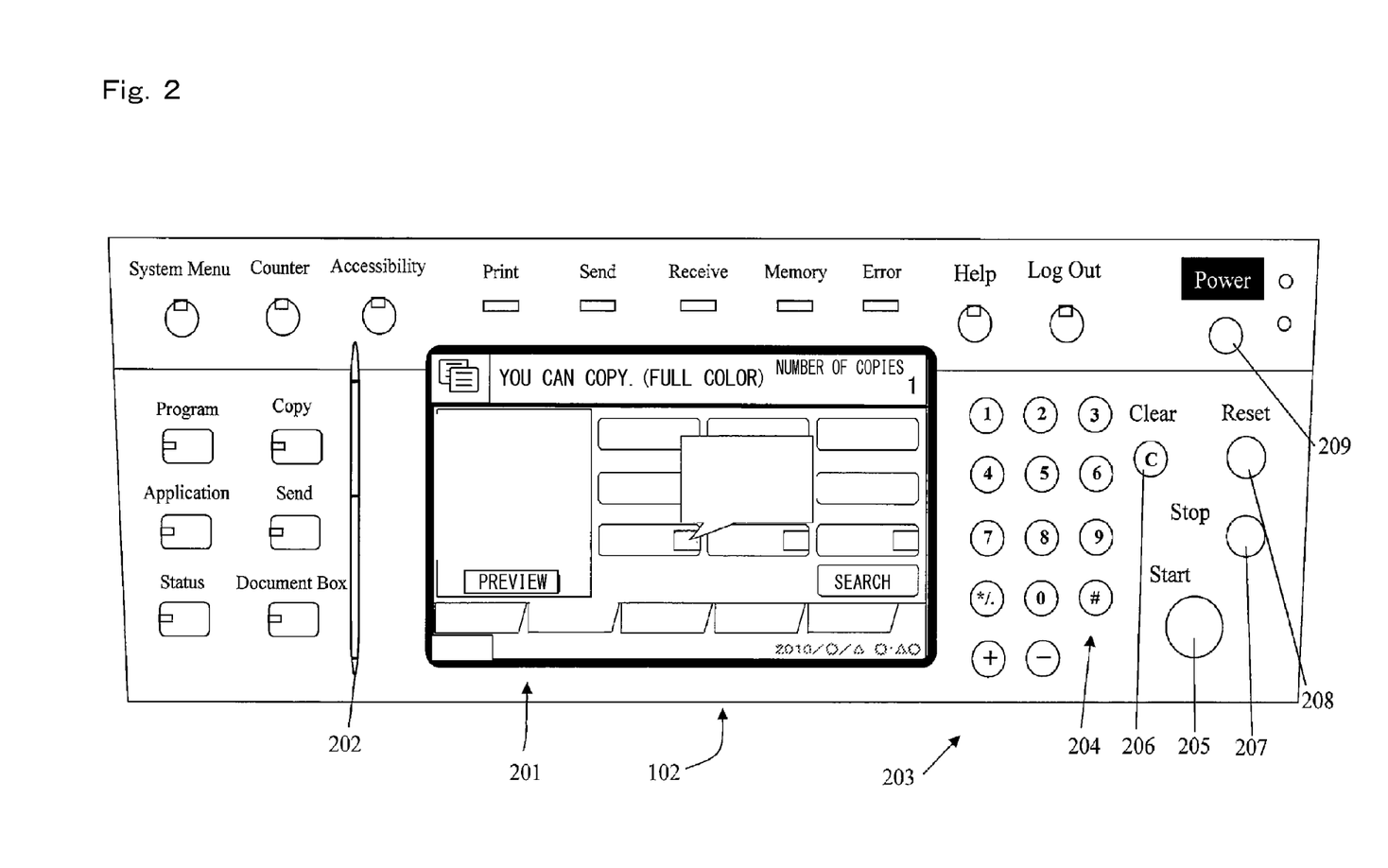
FIG. 2 is a conceptual diagram showing the overall configuration of an operation portion according to the present disclosure.

FIG. 2 is a conceptual diagram showing the overall configuration of an operation portion according to the present disclosure. Using the operation portion 102, the user inputs a setting condition regarding image formation as described above and confirms the input setting condition. To input the setting condition, a touch panel 201 (an operation panel), a touch pen 202, and operation keys 203 included in the operation portion 102 are used.

The touch panel 201 employs an analog resistive film method and is configured such that an upper film and a lower glass substrate having translucency are laminated together with a spacer between them. On the opposing surfaces of the upper film and the lower glass substrate, transparent electrode layers made of ITO (Indium Tin Oxide) or the like are provided. Further, the touch panel 201 is configured such that when the upper film has been pressed by the user, the portions of the transparent electrode layer on the upper film side and the transparent electrode layer on the lower glass substrate side that correspond to the pressed position come into contact with each other. Voltage is applied to the upper film or the lower glass substrate, and a voltage value corresponding to the pressed position is obtained from the lower glass substrate or the upper film, thereby detecting a coordinate value (pressed position) corresponding to the voltage value. If the detected pressed position has been included in the display area of a setting item key or the like in a screen displayed on the touch panel, the content of the setting item is input (set).

In addition, a display portion such as an LCD (Liquid Crystal Display) is provided under the lower glass substrate so that the display portion displays a screen such as, for example, an initial screen or a copy function screen, thereby displaying a specific screen on the touch panel 201. This provides the touch panel 201 with both the function of inputting a setting condition or the like and the function of displaying the setting condition or the like.

In addition, the touch pen 202 is provided near the touch panel 201 so that when the user has brought the tip of the touch pen 202 into contact with the touch panel 201, a coordinate value corresponding to the contact position (pressed position) is output in a similar manner to the above. This enables the user to press and select a displayed setting item key or the like using the touch pen 202.

Further, a predetermined number of operation keys 203 are provided near the touch panel 201 so as to include, for example, a numerical keypad 204, a start key 205, a clear key 206, a stop key 207, a reset key 208, and a power key 209.

Figure 3:
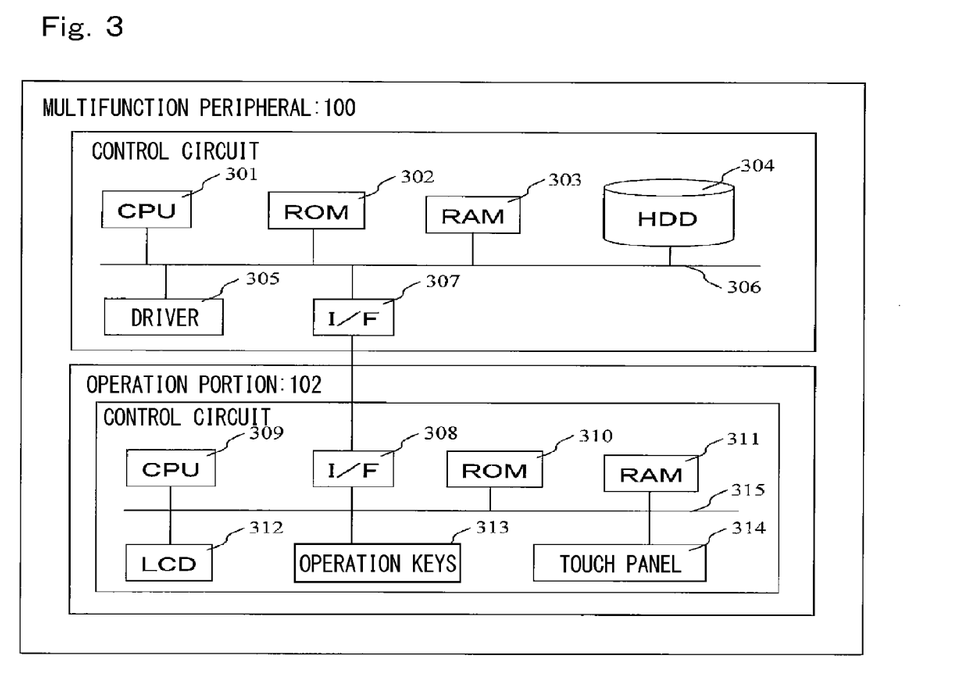
FIG. 3 is a diagram showing the configuration of the control system hardware of the multifunction peripheral and the operation portion according to the present disclosure.

Next, with reference to FIG. 3, the configuration of the control system hardware of the multifunction peripheral 100 and the operation portion 102 will be described. In FIG. 3, the details of components not directly related to the present disclosure are omitted.

In the control circuit of the multifunction peripheral 100, a CPU 301, a ROM 302, a RAM 303, an HDD 304, and a driver 305, which corresponds to all driving portions, are connected to one another via an internal bus 306. Using, for example, the RAM 303 as a work area, the CPU 301 executes a program stored in the ROM 302, the HDD 304, or the like, receives data and an instruction from the driver 305 and the operation portion 102 on the basis of the result of the execution, and controls the operations of all the driving portions shown in FIG. 1. Further, the CPU 301 executes a program, thereby achieving also all functional portion described later (shown in FIG. 4) other than the driving portions.

In addition, the internal bus 306 of the control circuit is connected also to an internal interface 307, and the internal interface 307 connects the control circuit of the operation portion 102 and the like to the control circuit of the multifunction peripheral 100. The CPU 301 receives a command signal from the control circuit of the operation portion 102 or the like via the internal interface 307 and transmits a command signal, data, and the like to the control circuit of the operation portion 102 or the like.

In addition, the control circuit of the operation portion 102 includes a CPU 309, a ROM 310, a RAM 311, an LCD 312, an operation key 313 (203), a touch panel 314 (201), and an internal interface 308, which are connected to one another via an internal bus 315. When the user has operated the operation key 313 or the touch panel 314, the CPU 309 transmits a command signal based on the operation to the control circuit of the multifunction peripheral 100 via the internal interface 308. Further, the functions of the CPU 309, the ROM 310, and the RAM 311 are similar to the above, and the CPU 309 executes a program, thereby achieving all functional portion described later (shown in FIG. 4). The ROM 310 stores a program and data for achieving all functional portion described below.

Embodiment of Present Disclosure

Figure 4:
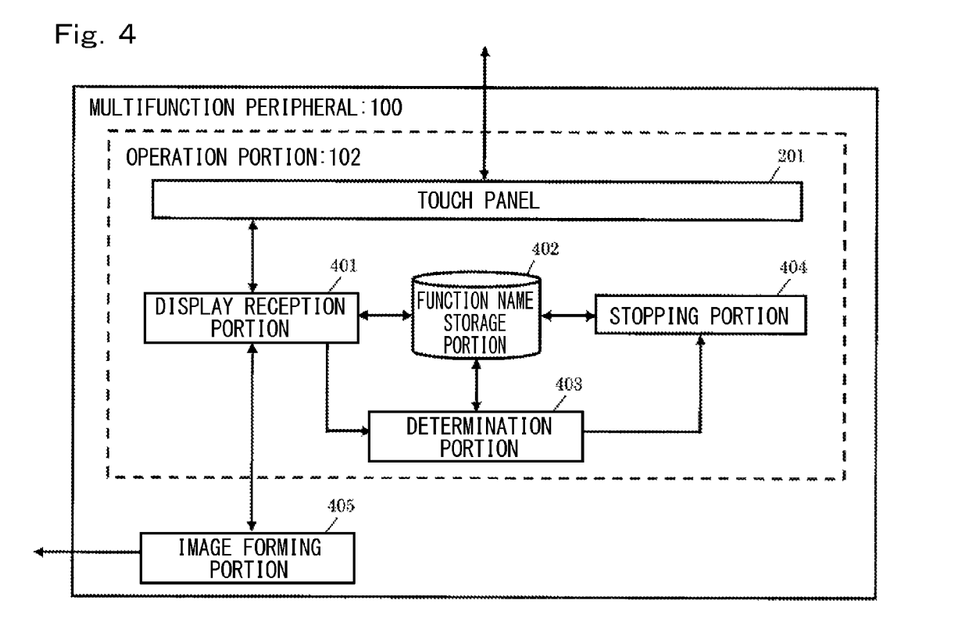
FIG. 4 is a functional block diagram showing the multifunction peripheral and the operation portion according to an embodiment of the present disclosure.

Next, with reference to FIGS. 4 and 5, a configuration and an execution procedure according to the embodiment of the present disclosure will be described.

Figure 5:
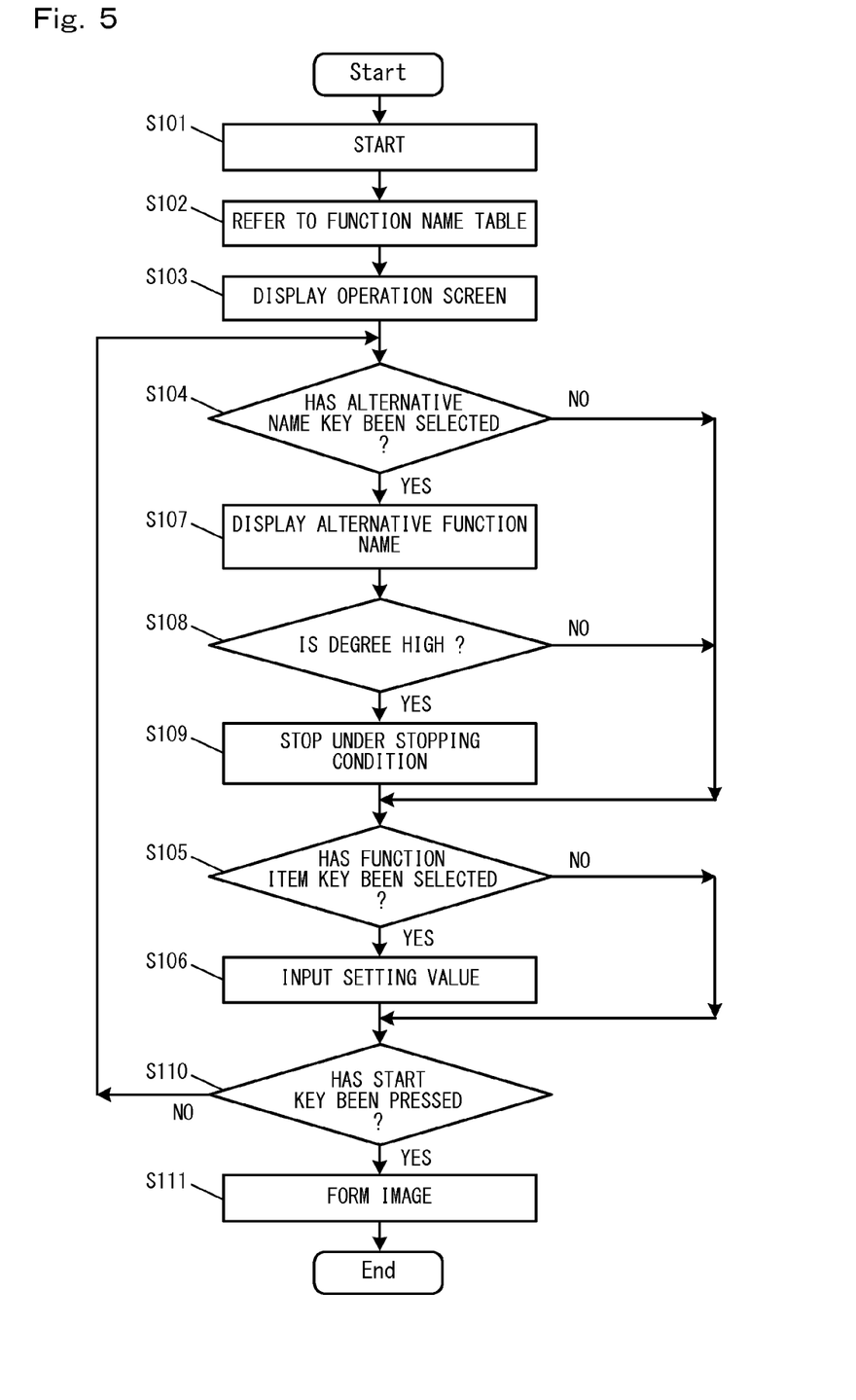
FIG. 5 is a flowchart showing an execution procedure of the embodiment of the present disclosure.

First, when the user has turned on the multifunction peripheral 100, the multifunction peripheral 100 starts with the operation portion 102 (FIG. 5: S101), and display reception portion 401 of the operation portion 102 refers to a function name table stored in function name storage portion 402 in order to display an operation screen on the touch panel (FIG. 5: S102).

Figure 6A:
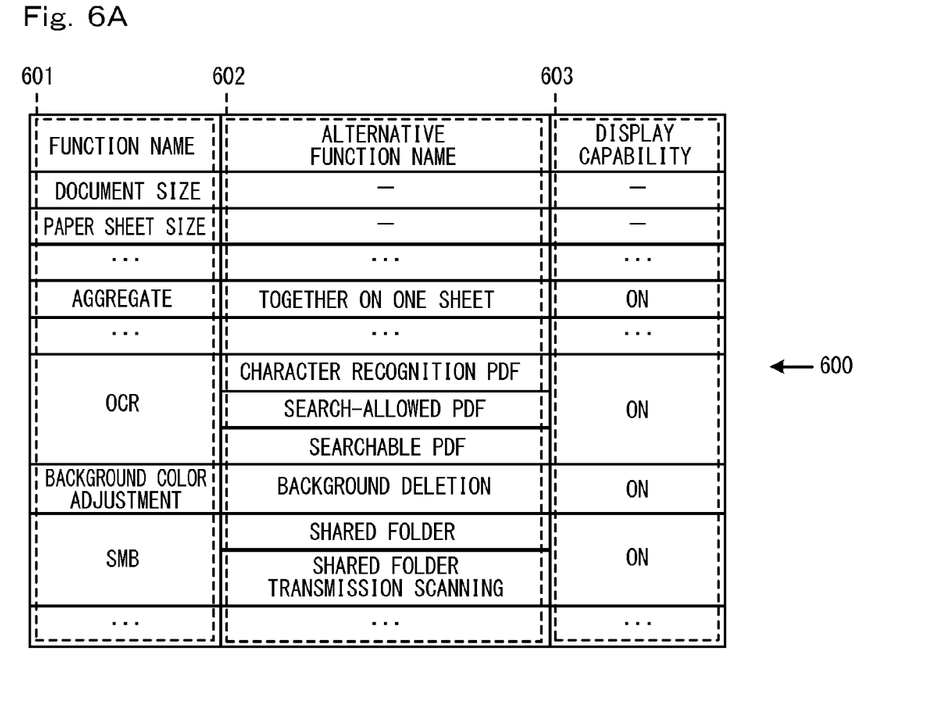
FIG. 6A is a diagram showing an example of a function name table according to the embodiment of the present disclosure.

As shown in FIG. 6A, a function name table 600 stores a function name 601, an alternative function name 602, and a display capability 603 in association with one another. The function name 601 is the function name of a key displayed on the operation screen. The alternative function name 602 is a name different from the function name 601 and represents a function substantially equivalent to the function of the function name 601. The display capability 603 indicates whether or not the alternative function name 602 is to be displayed.

Here, a function represented by the function name 601 refers to a function that can be provided by the multifunction peripheral 100, and corresponds to, for example, a copy function, a facsimile transmission/reception function, or the like.

In addition, the alternative function name 602 corresponds to a name given as an alternative name by another manufacturing company different from the manufacturing company of the multifunction peripheral 100. Thus, if a name different from the function name 601 does not exist, specifically, if a name given to the function name 601 as an alternative name by another manufacturing company does not exist, "-", which indicates that the alternative function name 602 does not exist, is stored as the alternative function name 602 in association with the function name 601.

For example, for the function name "document sheet size", a name different from the function name "document sheet size" does not exist, and therefore, "-" is stored as the alternative function name 602 in association with the function name "document sheet size".

On the other hand, for the function name "aggregate", a name different from the function name "aggregate" exists. Specifically, "together on one sheet", which is substantially equivalent to the function of the function name "aggregate", exists. In this case, as the alternative function name 602 corresponding to the function name "aggregate", "together on one sheet" is stored in association with the function name "aggregate".

In addition, "character recognition PDF", "search-allowed PDF", and "searchable PDF" are stored as the alternative function name 602 in association with the function name "OCR" (Optical Character Reader). Further, "background deletion" is stored as the alternative function name 602 in association with the function name "background color adjustment". Furthermore, "shared folder" and "shared folder transmission scanning" are stored as the alternative function name 602 in association with the function name "SMB" (Server Message Block).

In addition, if the alternative function name 602 exists, either "ON" or "OFF" is stored as the display capability 603 in association with the alternative function name 602, "ON" indicating that the alternative function name 602 is to be displayed, "OFF" indicating that the alternative function name 602 is not to be displayed. It should be noted that at the current moment, the function name table 600 shown in FIG. 6A stores "ON" in association with the existing alternative function name 602 so as to correspond thereto.

Having referred to the function name table 600, the display reception portion 401 refers to the function name 601 in the function name table 600 and also refers to the alternative function name 602 and the display capability 603 in the function name table 600. Further, the display reception portion 401 refers to, as an initial condition, a setting value (initial value) of each function name stored in advance in a predetermined memory, and displays the operation screen on the touch panel 201 on the basis of the result of the reference (FIG. 5: S103).

Figure 6B:
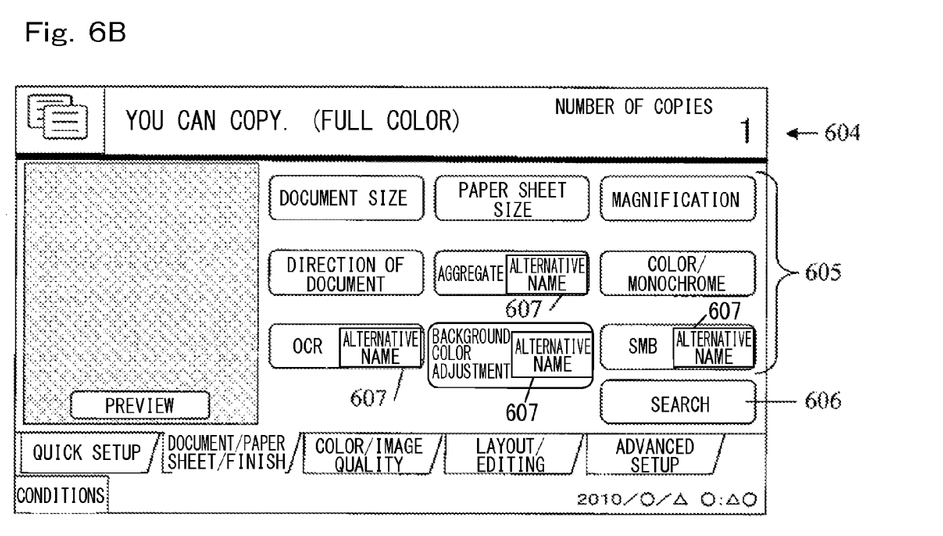
FIG. 6B is a diagram showing an example of an operation screen displayed on a touch panel according to the embodiment of the present disclosure.

On an operation screen 604, as shown in FIG. 6B, function item keys 605 represented by the function name 601 and a search key 606 for searching for the function item keys 605 are displayed so that the function item keys 605 and the search key 606 can be pressed. It should be noted that the search key 606 is used when it is necessary to display a plurality of operation screens to display the function item keys 605.

Here, if the alternative function name 602 exists for the function name 601 and the display capability 603 indicates "ON", the display reception portion 401 displays an alternative name key 607 near the function item key 605 (a right end portion inside the function item key 605) so that the alternative name key 607 can be pressed. In FIG. 6B, alternative name keys 607 are displayed near an aggregate key, an OCR key, a background color adjustment key, and an SMB key among the function item keys 605 so that the alternative name keys 607 can be pressed.

Here, if the user can understand the function name of the function item key 605 while viewing the operation screen 604, the user does not press the alternative name key 607 (FIG. 5: S104, NO), and directly presses the function item key 605 (FIG. 5: S105, YES). Consequently, the display reception portion 401 receives the pressing of the function item key 605, and for example, displays a setting value input screen corresponding to the function name (function item) on the touch panel, thereby receiving an input of a setting value of the function of the function name from the user (FIG. 5: S106). This enables the user to input a setting condition of a desired function.

On the other hand, the case is considered where, in S104, the user cannot understand the function name of the function item key 605 while viewing the operation screen 604. For example, if the multifunction peripheral 100 is a multifunction peripheral after replacement, and the manufacturing company of the multifunction peripheral before the replacement is different from the manufacturing company of the multifunction peripheral after the replacement, and the function name on the operation screen after the replacement is different from the function name on the operation screen before the replacement, the user cannot understand the function name of the function item key 605.

Specifically, if the user cannot understand the function name "OCR" of the OCR key among the function item keys 605, the user presses the alternative name key 607 of the OCR key (FIG. 5: S104, YES). Consequently, the display reception portion 401 receives the pressing of the alternative name key 607, refers to the function name table 600, and displays near the function item key 605 an alternative function name, of the alternative name key 607, corresponding to the function name of the function item key 605 (FIG. 5: S107).

Figure 7A:
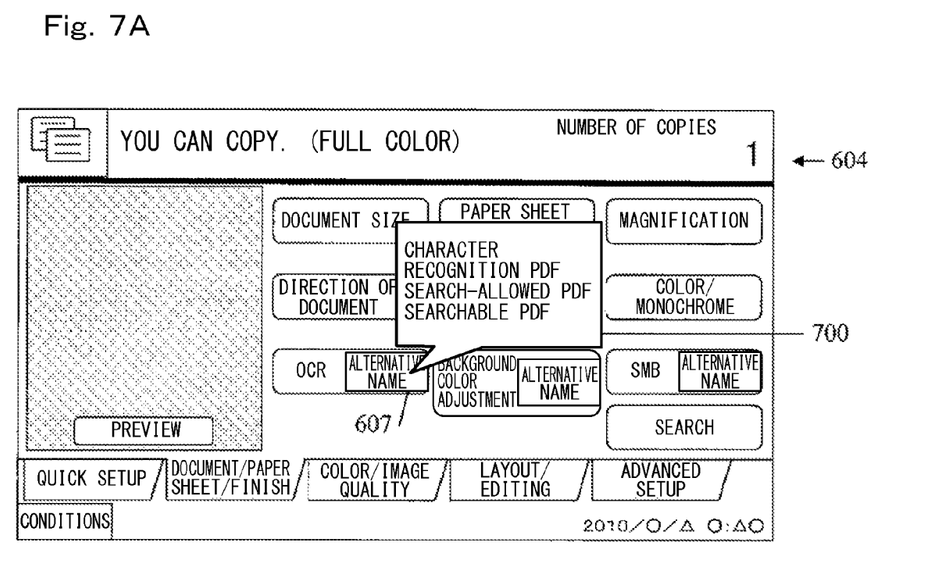
FIG. 7A is a diagram showing an example of the operation screen displayed on the touch panel according to the embodiment of the present disclosure.

As shown in FIG. 7A, "character recognition PDF", "search-allowed PDF", and "searchable PDF" of an alternative function name 700 are displayed on the operation screen 604 as a list in the form of a speech balloon from the alternative name key 607 of the OCR key.

Consequently, as described above, even if the multifunction peripheral 100 is a multifunction peripheral after replacement and the function names on the operation screens before and after the replacement are different from each other, the user may press the alternative name key 607 of the function item key 605 that the user cannot understand, whereby the alternative function name 602 corresponding to the function name 601 of the function item key 605 is displayed. Thus, even if a function item key 605 that the user cannot understand is present on an initially displayed operation screen, the user can display the alternative function name 602 by pressing the alternative name key 607, and can understand the function of the function name of the function item key 605. This prevents the user from being confused about a key operation.

Such a configuration is effective particularly in the case where the user is accustomed to the function name on the operation screen before replacement and the function name on the operation screen after the replacement dramatically changes from the function name on the operation screen before the replacement, for example, in the case where the manufacturing companies of the multifunction peripherals before and after the replacement are different from each other.

Here, the method of deleting the displayed alternative function name 700 is not particularly limited, and may be any method. Examples of the method include a method where the display reception portion 401 stops the display of the alternative function name 700, for example, when the user has stopped pressing the alternative name key 607, when the alternative name key 607 has been pressed again with the alternative function name 700 being displayed, or when a predetermined time (1 second, 3 seconds, 5 seconds, or the like) has elapsed since the alternative function name 700 has been displayed.

In addition, when the display reception portion 401 has displayed the alternative function name 602, the display reception portion 401 notifies determination portion 403 that the display reception portion 401 has displayed the alternative function name 602. Having received the notification, the determination portion 403 determines whether or not the degree of similarity between the displayed alternative function name 602 and the corresponding function name 601 is high.

Here, the degree of similarity between the alternative function name 602 and the function name 601 is a criterion of whether or not the user can guess the content of the function of the alternative function name 602 from the function name 601 by using the alternative function name 602 and the function name 601a predetermined number of times or for a predetermined period. If the degree is high, the user can guess the content of the function of the alternative function name 602 from the function name 601. If the degree is low, the user cannot guess the content of the function of the alternative function name 602 from the function name 601.

The method of determining whether or not the degree of similarity between the alternative function name 602 and the function name 601 is high may be any method. For example, the method may determine whether or not some of the characters of the alternative function name 602 match some of the characters of the function name 601, or may determine whether or not the alternative function name 602 (for example, "search-allowed PDF") is the alphabetical display (for example, "searchable PDF"), the Chinese character display, or the alphabetical character display of the function name 601.

In the embodiment of the present disclosure, the determination portion 403 compares the characters of the alternative function name 602 with the characters of the function name 601 corresponding to the alternative function name 602, thereby determining whether or not some of the characters of the alternative function name 602 match some of the characters of the function name 601 (FIG. 5: S108).

If, as a result of the determination, some of the characters of the alternative function name 602 match some of the characters of the function name 601, for example, if a part of "background deletion" of the alternative function name 602 matches a part of "background color adjustment" of the function name 601 (FIG. 5: S108, YES), the determination portion 403 determines that the alternative function name 602 is so similar to the function name 601 that the user can guess the content of the function of the alternative function name 602 from the function name 601, and the determination portion 403 notifies stopping portion 404 of the result of the determination. Having received the notification, the stopping portion 404 stops the display of the alternative function name 700 based on the pressing of the alternative name key 607, after the satisfaction of a predetermined stopping condition (FIG. 5: S109).

Examples of the state after the satisfaction of the stopping condition include: the state after the number of times the alternative name key 607 of the function item key 605 of the function name 601 that matches some of the characters of the alternative function name 602 has been pressed has reached a predetermined number of times (for example, 10 times, 30 times, or the like); or the state after a predetermined period (for example, a month, half a year, a year, or the like) has elapsed since the alternative name key 607 has been pressed for the first time.

Consequently, at the time when, as a result of using the alternative function name 602 and the function name 601a predetermined number of times or for a predetermined period, the user has become able to guess the content of the function corresponding to the alternative function name 602 from the function name 601, in other words, at the time when the user has become accustomed to the operation screen 604 after replacement, the display of the alternative function name 700 based on the pressing of the alternative name key 607 is stopped to reduce information to be displayed on the operation screen 604, thereby increasing the convenience of the user.

In addition, the method where the stopping portion 404 stops the display of the alternative function name 700 based on the pressing of the alternative name key 607 may be any method. For example, the stopping portion 404 refers to the function name table 600 and changes (rewrites) "ON" of the display capability 603 corresponding to "background deletion" of the alternative function name 602 that matches some of the characters of "background color adjustment" of the function name 601, in other words, "background deletion" of the alternative function name 602 displayed based on the pressing of the alternative name key 607, to "OFF".

Figure 7B:
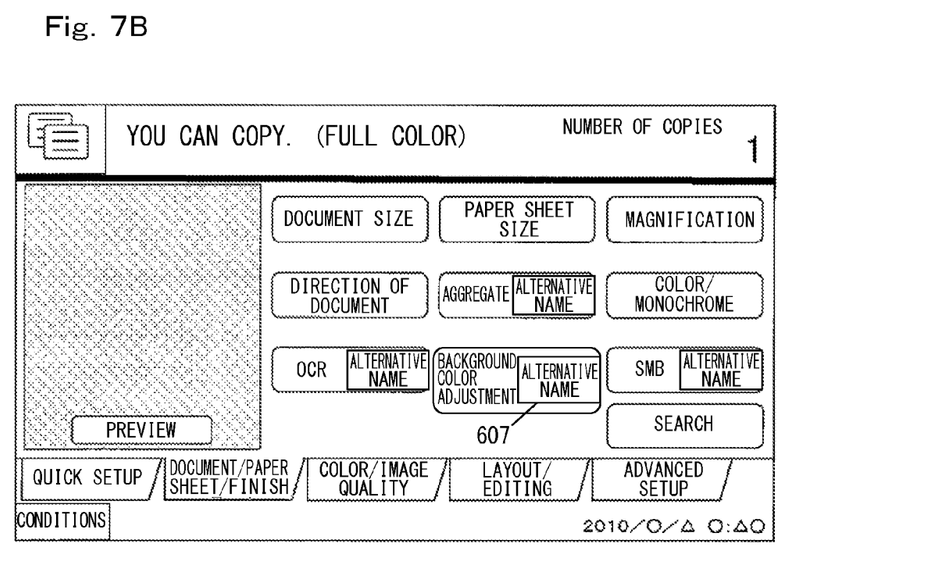
FIG. 7B is a diagram showing an example of the operation screen displayed on the touch panel according to the embodiment of the present disclosure.

Consequently, if the display reception portion 401 displays "background deletion" of the function name 601 on the operation screen 604 again after the change, the display of the alternative name key 607 near the function item key 605 of the function name 601 ("background color adjustment") that matches some of the characters ("background deletion") of the alternative function name 602 is stopped as shown in FIG. 7B. It goes without saying that the display of the alternative name key 607 is stopped after the satisfaction of the stopping condition.

On the other hand, in S108, if some of the characters of the alternative function name 602 do not match some of the characters of the function name 601 (FIG. 5: S108, NO), for example, if, as described above, parts of "character recognition PDF", "search-allowed PDF", and "searchable PDF" of the alternative function name 602 do not match a part of "OCR" of the function name 601, the determination portion 403 determines that the alternative function name 602 is so different from the function name 601 that the user cannot guess the alternative function name 602 from the function name 601. Then, the determination portion 403 ends the processing.

Consequently, even if, as a result of using the alternative function name 602 and the function name 601a predetermined number of times or for a predetermined period, the user cannot guess the content of the function corresponding to the alternative function name 602 from the function name 601, the alternative function name 602 is constantly ready to be displayed. This makes it possible to eliminate the confusion of the user about a key operation.

It should be noted that when the alternative function name 700 has been displayed, the user can understand the function name of the function item key 605. Thus, in S105, the user directly presses the function item key 605 (FIG. 5: S105, YES), and inputs a setting value (FIG. 5: S106).

In S110, when the user has pressed the start key 205 while viewing the operation screen 604 (FIG. 5: S110, YES), the display reception portion 401 receives the pressing of the start key 205 and the current setting condition and notifies image forming portion 405 in the multifunction peripheral 100 of the result of the reception. Having received the notification, the image forming portion 405 forms an image on a predetermined sheet on the basis of the setting condition (FIG. 5: S111).

This enables the user to obtain printed matter printed under a desired setting condition.

It should be noted that if the user accepts the initial condition as a setting condition, for example, the user may not press the alternative name key 607 and the function item key 605 (FIG. 5: S104, NO→S105, NO), and may press the start key 205 (FIG. 5: S110, YES). Also in this case, the same result is obtained.

The operation portion 102 according to the present disclosure is thus configured, and therefore, even if the user cannot understand the content of the function of a function name, the user can understand the content of the function of the function name with reference to an alternative function name corresponding to the function name. Thus, even if, for example, the interchangeabilities of the function names of function item keys are different between companies, the user can input a desired setting condition without being confused about a key operation.

It should be noted that the operation portion 102 according to the embodiment of the present disclosure is configured such that the display reception portion 401 displays the alternative function name 602 based on the pressing of the alternative name key 607. Alternatively, the operation portion 102 may have another configuration.

For example, in S103, when the user has pressed the search key 606 while viewing the operation screen 604, the display reception portion 401 receives the pressing of the search key 606 and displays a search screen in front of the operation screen 604.

Figure 8A:
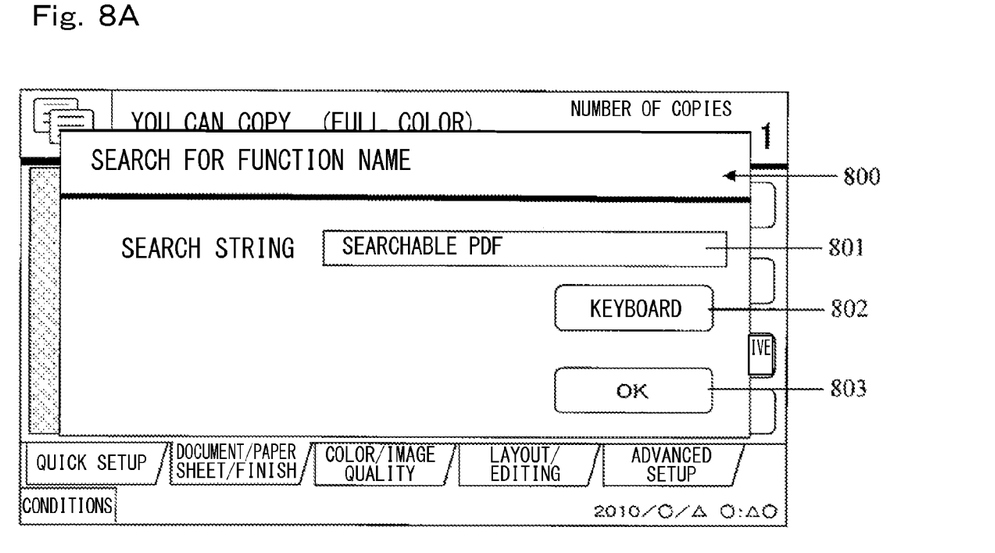
FIG. 8A is a diagram showing an example of the operation screen displayed on the touch panel according to the embodiment of the present disclosure.

On a search screen 800, as shown in FIG. 8A, a search box 801 for inputting characters to be searched for, a keyboard key 802 for inputting characters to the search box 801, and an OK key 803 are displayed.

When the user has input, for example, "searchable PDF" as input characters to the search box 801 using the keyboard key 802 while viewing the search screen 800, and has pressed the OK key 803, the display reception portion 401 receives the input characters and the pressing of the OK key 803. Then, the display reception portion 401 refers to the function name table 600 and performs a search by determining whether or not the input characters are present in a function name or an alternative function name in the function name table 600.

If, as a result of the search, the input characters are not present in a function name or an alternative function name in the function name table 600, the display reception portion 401 displays in front of the search screen 800 a message indicating that the input characters are not present, and thereafter, the display reception portion 401 deletes the search screen 800.

On the other hand, if, as a result of the search, the input characters are present in a function name or an alternative function name in the function name table 600, the display reception portion 401 displays the function name or the alternative function name in which the input characters are present.

Here, if such a function name exists, the display reception portion 401 deletes the search screen 800 and highlights the function item key 605 of the existing function name in the operation screen 604 (for example, sets the background color of the function item key 605 of the existing function name to a color different from the background colors of the other function item keys 605), thereby notifying the user of the existing function name.

Figure 8B:
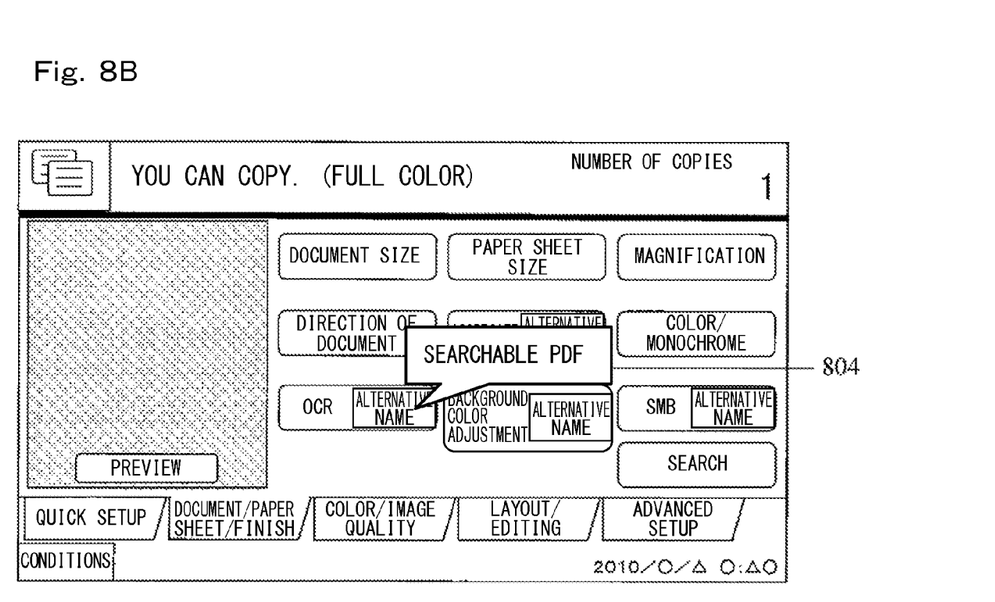
FIG. 8B is a diagram showing an example of the operation screen displayed on the touch panel according to the embodiment of the present disclosure.

On the other hand, if such an alternative function name exists, the display reception portion 401 deletes the search screen 800, and as shown in FIG. 8B, displays the existing alternative function name near the function item key 605 of the function name corresponding to the existing alternative function name in the form of a speech balloon.

Consequently, the alternative function name for which the user has searched is displayed near the function item key 605. This enables the user to search out at a glance the function item key 605 for which the user has searched. Particularly, it is highly likely that the alternative function name for which the user has searched is a function name that the user has not been able to easily find on the operation screen 604. Thus, the employment of the above configuration is very convenient for the user having searched for the location of the function item key 605 that the user has wished to use.

It goes without saying that the configuration is such that even when an alternative function name has been displayed on the search screen 800, the determination portion 403 determines whether or not the degree of similarity between the displayed alternative function name and the corresponding function name. Then, if the degree of similarity between the alternative function name and the function name is high, the stopping portion 404 stops the display of the alternative function name after the satisfaction of a predetermined stopping condition.

In addition, the operation portion 102 according to the embodiment of the present disclosure is applied to a function name. Alternatively, the operation portion 102 may be applied to a selection name or a selection item belonging to a function name or a function item. The selection name or the selection item is a subordinate concept of the function name or the function item and corresponds to a specific setting value. Yet alternatively, the operation portion 102 may be applied to a setting name or a setting item as another expression.

In addition, the operation portion 102 according to the embodiment of the present disclosure is described in the case where the operation portion 102 is applied to the multifunction peripheral 100. Alternatively, the operation portion 102 provides a similar operation and effect also when the operation portion 102 is applied to various image forming apparatuses, various image processing apparatuses, various image editing apparatuses, various image display apparatuses, and the like including the operation portion 102 (the operation device) having the touch panel 201.

In addition, in the embodiment of the present disclosure, the configuration is such that the operation portion 102 of the multifunction peripheral 100 includes all the functional portion. Alternatively, the configuration may be such that a program for achieving all the functional portion is stored in a storage medium, and the storage medium is provided. In this configuration, the operation portion 102 or the multifunction peripheral 100 reads the program, and the operation portion 102 or the multifunction peripheral 100 having read the program achieves all the functional portion. In this case, the program itself read from the storage medium provides the operation and effect of the present disclosure. Further, the embodiment of the present disclosure can be provided also as a method of storing in a hard disk the steps to be executed by all the functional portion.

As described above, the operation device, the image forming apparatus, and the operation method according to the present disclosure are useful not only for an operation portion but also for a multifunction peripheral, a copying machine, a printer, and the like including the operation portion, and are effective as an operation device, an image forming apparatus, and an operation method that enable a user to input a desired setting condition without being confused about a key operation even if the interchangeabilities of the names of keys are different between companies.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An operation device comprising:
a touch panel that displays a predetermined screen, and, when a key representing a predetermined name of a function has been pressed on the screen, receives an input of a setting condition regarding the key;
a storage portion that stores as a table the predetermined name of the function corresponding to the key displayed on the screen and a predetermined alternative name that is associated with the predetermined name, the alternative name being different from the predetermined name and representing a function substantially equivalent to the function represented by the predetermined name;
a display reception portion that, if the alternative name that is associated with the predetermined name in the table exists, displays, near the key representing the predetermined name associated with the alternative name, an alternative name key so that the alternative name key can be pressed, and when the alternative name key has been pressed, displays the alternative name near the alternative name key;
a determination portion that, when the display reception portion has displayed the alternative name, determines whether or not a degree of similarity between the displayed alternative name and the predetermined name corresponding to the alternative name is high; and
a stopping portion that, if the degree of similarity between the alternative name and the predetermined name is high, stops the display of the alternative name and stops the display of the alternative name key corresponding to the alternative name after satisfaction of a predetermined stopping condition.

2. An operation device comprising:
a touch panel that displays a predetermined screen, and, when a key representing a predetermined name of a function has been pressed on the screen, receives an input of a setting condition regarding the key;
a storage portion that stores as a table the predetermined name of the function corresponding to the key displayed on the screen and a predetermined alternative name that is associated with the predetermined name, the alternative name being different from the predetermined name and representing a function substantially equivalent to the function represented by the predetermined name;
a display reception portion that, if the alternative name that is associated with the predetermined name in the table exists, displays, near the key representing the predetermined name associated with the alternative name, the alternative name corresponding to the predetermined name;
a determination portion that, when the display reception portion has displayed the alternative name, determines whether or not a degree of similarity between the displayed alternative name and the predetermined name corresponding to the alternative name is high; and
a stopping portion that, if the degree of similarity between the alternative name and the predetermined name is high, stops the display of the alternative name after satisfaction of a predetermined stopping condition, wherein,
if a text string to be searched for has been input through a predetermined search screen, the display reception portion performs a search by determining whether or not the text string is present in an alternative name corresponding to a predetermined name in the table, and if the text string is present in an alternative name corresponding to a predetermined name in the table, the display reception portion displays the alternative name near a key of the predetermined name corresponding to the alternative name in which the text string is present.

3. An image forming apparatus comprising:
a touch panel that displays a predetermined screen, and, when a key representing a predetermined name of a function has been pressed on the screen, receives an input of a setting condition regarding the key;
a storage portion that stores as a table the predetermined name of the function corresponding to the key displayed on the screen and a predetermined alternative name that is associated with the predetermined name, the alternative name being different from the predetermined name and representing a function substantially equivalent to the function represented by the predetermined name; and a display reception portion that, if the alternative name that is associated with the predetermined name in the table exists, displays, near the key representing the predetermined name associated with the alternative name, an alternative name key so that the alternative name key can be pressed, and when the alternative name key has been pressed, displays the alternative name near the alternative name key;

a determination portion that, when the display reception portion has displayed the alternative name, determines whether or not a degree of similarity between the displayed alternative name and the predetermined name corresponding to the alternative name is high; and a stopping portion that, if the degree of similarity between the alternative name and the predetermined name is high, stops the display of the alternative name and stops the display of the alternative name key corresponding to the alternative name after satisfaction of a predetermined stopping condition.

4. An image forming apparatus comprising:

a touch panel that displays a predetermined screen, and, when a key representing a predetermined name of a function has been pressed on the screen, receives an input of a setting condition regarding the key;

a storage portion that stores as a table the predetermined name of the function corresponding to the key displayed on the screen and a predetermined alternative name that is associated with the predetermined name, the alternative name being different from the predetermined name and representing a function substantially equivalent to the function represented by the predetermined name;

a display reception portion that, if the alternative name that is associated with the predetermined name in the table exists, displays, near the key representing the predetermined name associated with the alternative name, the alternative name corresponding to the predetermined name;

a determination portion that, when the display reception portion has displayed the alternative name, determines whether or not a degree of similarity between the displayed alternative name and the predetermined name corresponding to the alternative name is high; and a stopping portion that, if the degree of similarity between the alternative name and the predetermined name is high, stops the display of the alternative name after satisfaction of a predetermined stopping condition, wherein, if a text string to be searched for has been input through a predetermined search screen, the display reception portion performs a search by determining whether or not the text string is present in an alternative name corresponding to a predetermined name in the table, and if the text string is present in an alternative name corresponding to a predetermined name in the table, the display reception portion displays the alternative name near a key of the predetermined name corresponding to the alternative name in which the text string is present.

5. An operation method of an operation device that, when a key representing a predetermined name of a function has been pressed on a predetermined screen on a touch panel, receives an input of a setting condition regarding the key, the operation method comprising:

a step of storing as a table the predetermined name of the function corresponding to the key displayed on the screen and a predetermined alternative name that is associated with the predetermined name, the alternative name being different from the predetermined name and representing a function substantially equivalent to the function represented by the predetermined name;

a step of, if the alternative name that is associated with the predetermined name in the table exists, displaying, near the key representing the predetermined name associated with the alternative name, an alternative name key so that the alternative name key can be pressed, and when the alternative name key has been pressed, displaying the alternative name near the alternative name key;

a step of, when the alternative name has been displayed, determining whether or not a degree of similarity between the displayed alternative name and the predetermined name corresponding to the alternative name is high; and a step of, if the degree of similarity between the alternative name and the predetermined name is high, stopping the display of the alternative name and stopping the display of the alternative name key corresponding to the alternative name after satisfaction of a predetermined stopping condition.

* * * * *